US009813666B2

(12) United States Patent
Law et al.

(10) Patent No.: US 9,813,666 B2
(45) Date of Patent: Nov. 7, 2017

(54) VIDEO TRANSMISSION AND RECONSTRUCTION

(75) Inventors: Henry Hing Law, Scarborough (CA);
Tung Chuen Kwong, Markham (CA);
Benjamin Koon Pan Chan, Markham (CA); Yugang Zhou, Markham (CA);
Wilson Hung Yu, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 13/482,808

(22) Filed: May 29, 2012

(65) Prior Publication Data

US 2013/0322513 A1 Dec. 5, 2013

(51) Int. Cl.
| | |
|---|---|
| *H04N 7/12* | (2006.01) |
| *G06K 9/46* | (2006.01) |
| *H04N 7/14* | (2006.01) |
| *G06T 9/20* | (2006.01) |

(52) U.S. Cl.
CPC ........ *H04N 7/14* (2013.01); *G06T 9/20* (2013.01)

(58) Field of Classification Search
CPC .... H04N 7/50; H04N 7/26244; H04N 9/8042; H04N 5/85; G06T 2210/44; G06T 13/00; G06T 13/80; G06T 13/20
USPC ................. 375/240.01; 345/646; 382/118
See application file for complete search history.

(56) References Cited

U.S. PATENT DOCUMENTS

| | | | | |
|---|---|---|---|---|
| 7,023,454 | B1 * | 4/2006 | Knight ................. | H04N 7/148 345/473 |
| 7,840,036 | B2 | 11/2010 | Higaki | |
| 2002/0154212 | A1 * | 10/2002 | Thomas ................. | G10L 21/06 348/14.13 |
| 2004/0218827 | A1 * | 11/2004 | Cohen ................ | G06K 9/00248 382/243 |
| 2005/0243167 | A1 * | 11/2005 | Clarke .................. | H04N 7/148 348/14.12 |
| 2006/0002469 | A1 * | 1/2006 | Zurov .................. | H04N 19/172 375/240.12 |
| 2007/0159552 | A1 * | 7/2007 | Wang .................. | H04N 19/507 348/439.1 |
| 2008/0013837 | A1 * | 1/2008 | Porter ................ | G06K 9/00248 382/218 |

(Continued)

FOREIGN PATENT DOCUMENTS

| | | |
|---|---|---|
| CN | 101018314 A | 8/2007 |
| CN | 101374220 A | 2/2009 |

(Continued)

OTHER PUBLICATIONS

Kantonen, et al., "Mixed Reality in Virtual World Teleconferencing," IEEE Virtual Reality 2010, pp. 179-182.

(Continued)

*Primary Examiner* — Dave Czekaj
*Assistant Examiner* — Tsion B Owens
(74) *Attorney, Agent, or Firm* — Knobbe, Martens, Olson & Bear, LLP (57) ABSTRACT

Systems and methods for reducing the bandwidth required to transmit video streams related to faces re described herein. In some aspects, contour information from face recognition technology is captured at a transmitting device and sent to a receiving device. The contour information may be used to reconstruct the face at the receiving device without the need to send an entire video frame of the face.

26 Claims, 8 Drawing Sheets

(56) References Cited

U.S. PATENT DOCUMENTS

| | | |
|---|---|---|
| 2010/0002909 A1 | 1/2010 | Lefevre et al. |
| 2010/0134588 A1 | 6/2010 | Kim |
| 2010/0166055 A1 | 7/2010 | Schmit et al. |
| 2011/0292054 A1* | 12/2011 | Boker .................... G06T 9/001 345/473 |
| 2013/0128962 A1* | 5/2013 | Rajagopalan ........ H04N 19/172 375/240.07 |
| 2013/0265378 A1* | 10/2013 | Abuan ................... H04N 7/147 348/14.02 |
| 2014/0016696 A1* | 1/2014 | Nelson ................. H04N 19/105 375/240.12 |

FOREIGN PATENT DOCUMENTS

| | | |
|---|---|---|
| CN | 102157007 A | 8/2011 |
| CN | 102271241 A | 12/2011 |
| EP | 0880286 A1 | 11/1998 |
| JP | H1070725 A | 3/1998 |
| JP | 2003244668 A | 8/2003 |
| JP | 2011228936 A | 11/2011 |
| WO | WO-2011087963 A1 | 7/2011 |

OTHER PUBLICATIONS

International Search Report and Written Opinion—PCT/US2013/042715—ISA/EPO—Dec. 9, 2013.

\* cited by examiner

VIDEO TRANSMISSION AND RECONSTRUCTION

BACKGROUND

Field

The present application relates generally to video capture devices, and more specifically to systems and methods for reducing the bandwidth required to transmit video streams related to faces.

Background

Video conferencing is used to help people communicate in remote locations. Using video conferencing, the image and voice of a user can be captured at one location and transmitted to another location. For example, many applications are designed to work in conjunction with a standard video capture device such as a webcam to stream video and/or audio over a network from one device to another device. Accordingly, users of the devices can participate in videophone calls or video conferencing. The applications are typically setup to specifically take video from the webcam and transmit the video frames in their entirety. This can require significant bandwidth to transmit the video frames, especially if the video frames are of a high resolution.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include systems and method for transmitting frames of video related to faces utilizing less bandwidth.

One aspect of the disclosure provides a method for reconstructing video data. The method comprises storing, at a receiving device, a keyframe. The method further comprises receiving, at the receiving device and from a transmitting device, contour information for one or more frames. The method further comprises generating one or more additional frames based on the keyframe and the contour information.

Another aspect of the disclosure provides an apparatus. The apparatus comprises a processor and a memory in communication with the processor. The memory comprises instructions that when executed by the processor cause the processor to store a keyframe. The instructions when executed by the processor further cause the processor to receive, from a transmitting device, contour information for one or more frames. The instructions when executed by the processor further cause the processor to generate one or more additional frames based on the keyframe and the contour information.

Another aspect of the disclosure provides an apparatus. The apparatus comprises means for storing a keyframe. The apparatus further comprises means for receiving from a transmitting device, contour information for one or more frames. The apparatus further comprises means for generating one or more additional frames based on the keyframe and the contour information.

Another aspect of the disclosure provides a computer program product for processing data for a program configured to receive video input from at least one capture device. The computer program product comprises a non-transitory computer-readable medium. The computer-readable medium has stored thereon code for causing a computer to store a keyframe. The computer-readable medium has stored thereon code for causing a computer to receive, from a transmitting device, contour information for one or more frames. The computer-readable medium has stored thereon code for causing a computer to generate one or more additional frames based on the keyframe and the contour information.

DETAILED DESCRIPTION

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The systems and methods described herein relate to techniques for reducing the bandwidth required to transmit video streams related to faces and or other defined objects with extractable features. Though the disclosure discusses faces in particular, the systems and methods herein may similarly be used with other defined objects with extractable features.

In some aspects, a first device (e.g., a laptop, desktop, tablet, phone, computing device, etc.) may be configured to transmit an image and/or video to a second device over a network (e.g., Internet, intranet, etc.). In some aspects, an image capture device (e.g., a camera, video camera, webcam, etc.) may be used to capture the image and/or the video made up of a series of images. Accordingly, the second device can receive the image captured at the first device and display the captured image.

In some cases, the captured image may include one or more people and a background (e.g., tables, chairs, room, outdoors, etc.). In some aspects, facial recognition techniques (e.g., OKAO Vision Face Sensing Technology by OMRON) may be used to detect the faces of the one or more people and extract contour information of the faces one or more people. The contour information may include the positions (e.g., locations, coordinates, etc.) of features (e.g., eyebrow, eye, nose, mouth, and other face contour information) of the faces of the one or more people. Instead of transmitting the entire captured image, the first device may transmit to the second device only the face contour information, such that the faces of the one or more people can be reconstructed at the second device. Since only face contour information is transmitted to the second device instead of the entire image, the bandwidth required for transmitting the image is reduced.

Figure 1A:
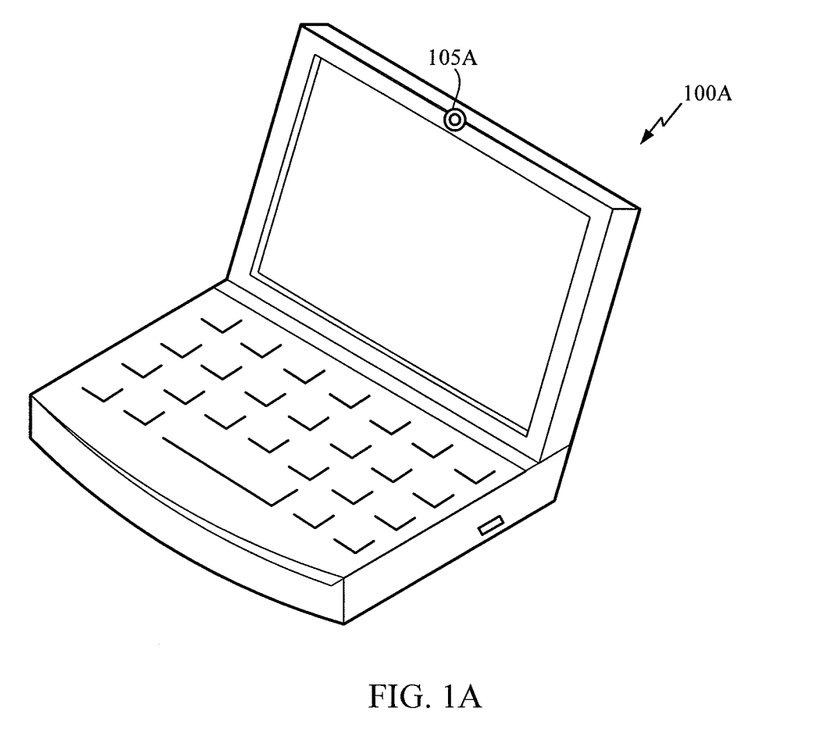
FIG. 1A illustrates an exemplary computing device.

The face contour information may be used by the second device to manipulate a keyframe in order to generate an image at the second device. In some aspects, the keyframe could be a frame sent from the first device to the second device that is the image captured by the image capture device, or some other stored image of a face at the second (e.g., a local static picture) (it does not necessarily have to be the face of a user of the first device (e.g., Mona Lisa)). Then, when the second device receives the face contour information from the first device, the second device can manipulate the keyframe image to change the expression of the face of the keyframe image to match the transmitted contour information from the first device FIG. 1A illustrates an exemplary computing device that may be used with embodiments described herein. The computing device 100a may be any well known computing system. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. As shown, the computing device 100a includes a camera 105a. The camera 105a is shown as an integrated camera built into the housing of the computing device 100a. The camera 105a may comprise a video capture device such as a digital camera, a digital video camera, webcam, etc.

Figure 1B:
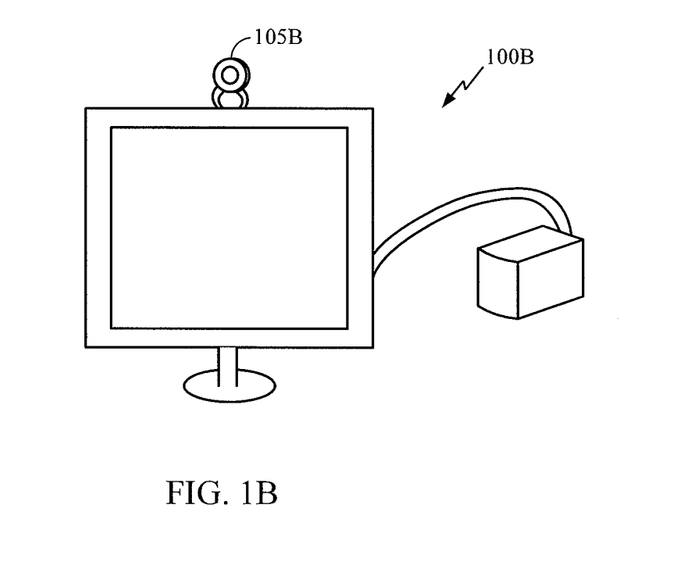
FIG. 1B illustrates another exemplary computing device.

FIG. 1B illustrates another exemplary computing device that may be used with embodiments described herein. The computing device 100b may also be any well known computing system. As shown the computing device 100b includes a camera 105b. The camera 105b is shown as an external camera that connects to the computing device 100b. The camera 105b may connects to the computing device 100b via a suitable interface such as universal serial bus (USB), FireWire, Thunderbolt, Light Peak, digital video interface (DVI), high-definition multimedia interface (HDMI), video graphics array (VGA), etc. The camera 105b may comprise a video capture device such as a digital camera, a digital video camera, webcam, etc.

Figure 2:
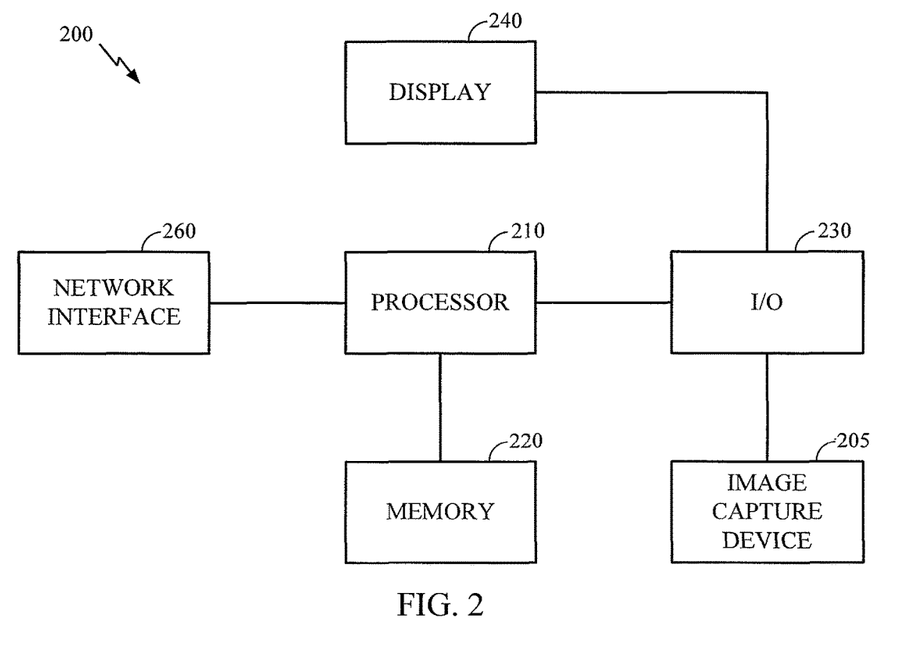
FIG. 2 is a functional block diagram of a computing device.

FIG. 2 is a functional block diagram of a computing device. The computing device 200 may correspond to any one of computing device 100a, computing device 100b, or another similar computing device. The computing device 200 includes a processor 210 in data communication with a memory 220, and an input/output interface 230. The input/output interface 230 is further in data communication with a display 240 and an image capture device 205. The image capture device 205 may correspond to any one of the camera 105a, the camera 105b, or another similar image capture device. The processor 210 is further in data communication with a network interface 260. Although described separately, it is to be appreciated that functional blocks described with respect to the computing device 100 need not be separate structural elements. For example, the processor 210 and memory 220 may be embodied in a single chip. Similarly, two or more of the processor 210, and network interface 260 may be embodied in a single chip. The computing device 200 may be configured to perform the functions described herein. For example, the processor 210 may be configured to execute instructions stored in the memory 220 that cause the computer device 200 to perform the functions described herein.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input/output interface 230 for, receiving input from and providing output to, devices connected to the computing device 100. Examples of such devices include, but are not limited to, a keyboard, buttons, keys, switches, a pointing device, a mouse, a joystick, a remote control, an infrared detector, an image capture device (e.g., image capture device 205), a DVD player, a Blu-ray player, a motion detector, a microphone (possibly coupled to audio processing software to, e.g., detect voice commands) visual output devices (e.g., display 240), including displays and printers, audio output devices, including speakers, headphones, earphones, and alarms, and haptic output devices, including force-feedback game controllers and vibrating devices.

The processor 210 is further coupled to a network interface 260. The network interface 260 may comprise one or more modems. The network interface 260 prepares data generated by the processor 210 for transmission to a network. The transceiver 260 also demodulates data received via the network. The network interface 260 can include a transmitter, receiver, or both. In other embodiments, the transmitter and receiver are two separate components. The network interface 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
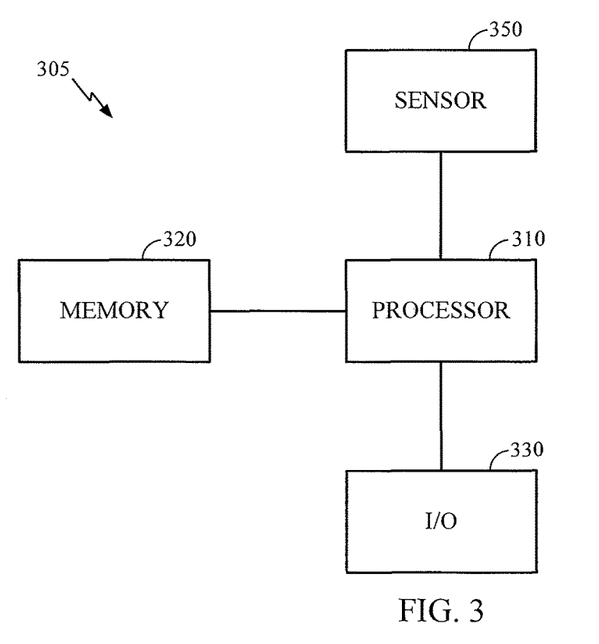
FIG. 3 is a functional block diagram of a video capture device.

FIG. 3 is a functional block diagram of a video capture device. The video capture device 305 may correspond to any one of the camera 105a, camera 105b, image capture device 205, or another similar video capture device. The video capture device 305 includes a processor 310 in data communication with a memory 320, and an input/output interface 330. The processor 310 is further in data communication with a sensor 350. Although described separately, it is to be appreciated that functional blocks described with respect to the video capture device 105 need not be separate structural elements. For example, the processor 310 and memory 320 may be embodied in a single chip.

The processor 310 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 310 can be coupled, via one or more buses, to read information from or write information to memory 320. The processor may additionally, or in the alternative, contain memory, such as processor registers. The memory 320 can include processor cache, including a multi-level hierarchical cache in which different levels have different capacities and access speeds. The memory 320 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 310 is also coupled to an input/output interface 330 for, receiving input from and providing output to a computing device such as the computing device 200. The input/output interface 330 may comprise a USB interface, a FireWire interface, etc.

The processor 310 is also coupled to a sensor 350 for, capturing images/video. The sensor 350 may comprise a CCD, CMOS, or other suitable type of sensor.

Figure 4:
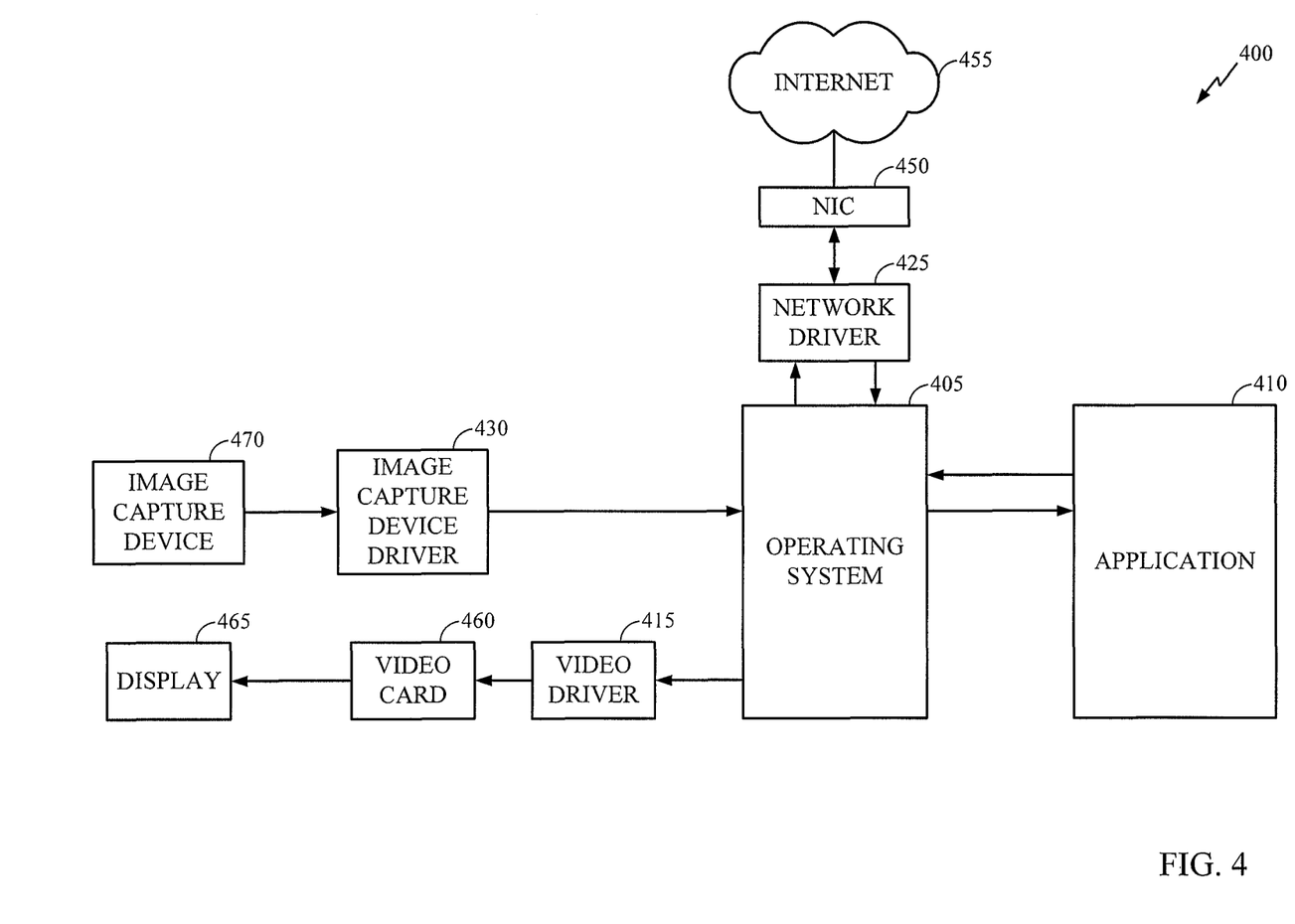
FIG. 4 is a functional block diagram of a computing system with an image capture device.

FIG. 4 is a functional block diagram of a computing system with an image capture device. Components of the computing system 400 may correspond to the computing device 200 or another suitable computing device. For example, the image capture device 470 may correspond to the image capture device 205, the display 465 to the display 240, the image capture device driver 430, operating system 405, network driver 425, application 420 and video driver 415 to software stored in the memory 220 and executed by the processor 210, the video card 415 to I/O 230, and the network interface card (NIC) 450 to network interface 260.

The system 400 includes an operating system 405, an application 410, a video driver 415, an image capture device driver 430, and a network driver 425, which may individually or collectively comprise one or more software modules that may be stored in a memory and executed by a processor such as the memory 220 and the processor 210 of the computing device 200.

The application 410 may comprise a video application for processing a captured image and transmitting it over a network, such as the Internet 455. The application 410 is configured to receive image/video data from an image capture device, such as the image capture device 470. For example, the image capture device driver 430 may be configured to communicate with the image capture device 470, e.g., image capture device 205. For example, the application 410 may capture image data through the image capture device 470. The application 410 may interact with the operating system 405, such as through APIs, to capture the image data. The operating system 405 may utilize the image capture device driver 430 to communicate with the image capture device 470 and receive image data from the image capture device 470, such as image data from a sensor on the image capture device 470. The operating system 405 may then direct the received image data to the application 410.

Figure 5:
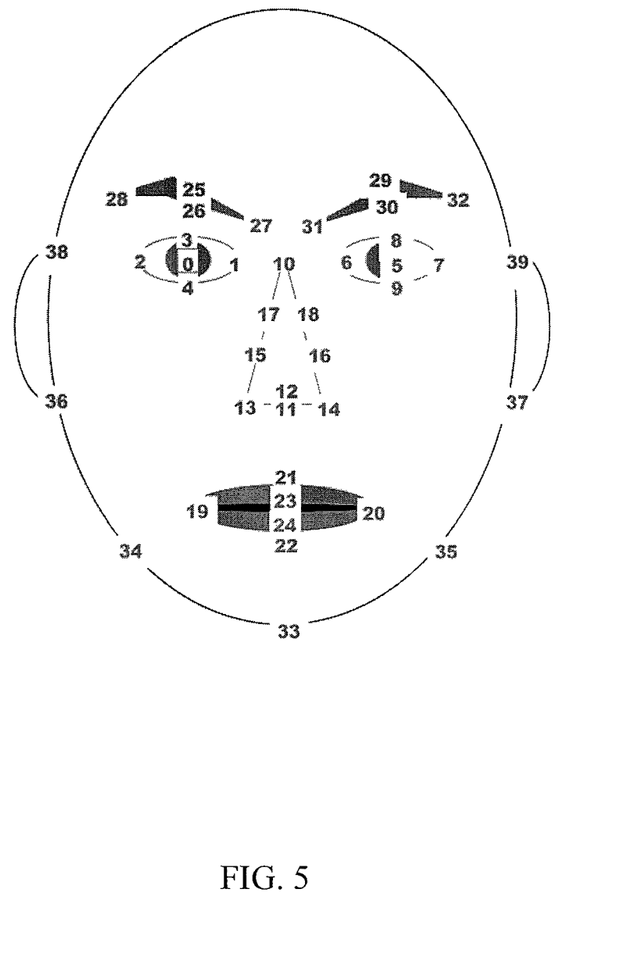
FIG. 5 illustrates an example of contour information that may be extracted.

The application 410 may then determine whether one or more faces are present in the image data using facial recognition techniques (e.g., OKAO Vision Face Sensing Technology by OMRON). Further, if one or more faces are present in the image data, the application 410 may extract contour information of the faces using facial recognition techniques (e.g., OKAO Vision Face Sensing Technology by OMRON). The contour information may include the positions of features (e.g., eyebrow, eye, nose, mouth, and other face contour information) of the faces of the one or more people. For example, FIG. 5 illustrates an example of contour information that may be extracted. The extracted contour information includes a number of coordinates that indicate the position/contours of various facial features.

The network driver 425 may be configured to transmit/receive input from a network interface card (NIC) 450, which may further be configured to communicate with a network such as an Internet Protocol network such as the Internet 455. For example, the operating system 405 may function to facilitate execution of the application 410. The application 410 may generate data (e.g., contour information) and interact with the operating system 405, such as through APIs, to transmit the data over the Internet 455 to another device connected to the Internet 455. The operating system 405 may send the data to the network driver 425, which controls the MC 450 to transmit the data over the Internet 455. Similarly, the NIC 450, network driver 425, operating system 405, and application 410 may function to receive contour from the Internet 455 at for example the application 410.

The application 410, when receiving the contour information, may be configured to reconstruct an image based on the contour information. For example, the application 410 may be configured to manipulate a keyframe using the contour information to reconstruct the image. The keyframe may be an image including one or more faces. Additionally, the keyframe may include one or more background objects. Each face of the keyframe may be associated with received contour information for a face. The received contour information may be used to manipulate the associated face of the keyframe. For example, the keyframe may have facial features (e.g., eyebrow, eye, nose, mouth, and other face contour information) at certain coordinates. The contour information may indicate that for a new frame of video, coordinates of the facial features should be in different locations. Accordingly, the application 410 may manipulate the keyframe, using image manipulation techniques, such as stretching, moving, scaling, etc., to move the facial features of the keyframe so that they align with the coordinates from the contour information.

In some aspects, the magnitude of the eye/eye-brow/mouth of a keyframe may be changed based on the received contour information to adjust the location of these features. In some aspects, the size of the face of the keyframe may be adjusted based on the distance of the user from the image capture device 470 as indicated by the contour information. In some aspects, the contour information comprises a mouth box, which houses a lip opening of a mouth. Accordingly, to reconstruct the image, teeth are drawn in the location of the mouth box indicated by the contour information. The face from the keyframe may then be drawn on top of the teeth, without the mouth opening of the keyframe being drawn. Upper and lower teeth may be drawn different sizes depending on the opening of the mouth indicated by the contour information and/or the expression indicated (smiling, frowning, speaking, etc.). Further, the teeth used for drawing may be user selectable. The lighting of the teeth may be manipulated to match the brightness of an environment indicated by the contour information.

Accordingly, for a video comprising a number of frames, the entire video frame does not need to be sent for each frame, but rather only face contour information for a next frame can be transmitted and a previous frame, such as a keyframe, updated based on the face contour information.

Figure 6A:
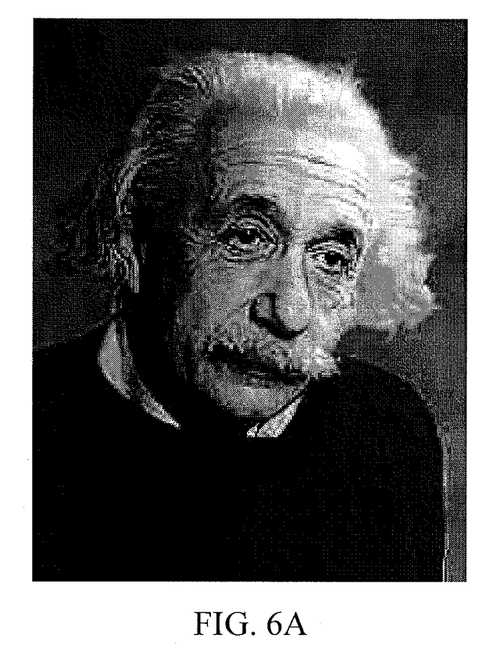
FIG. 6A illustrates an example of a keyframe.
Figure 6B:
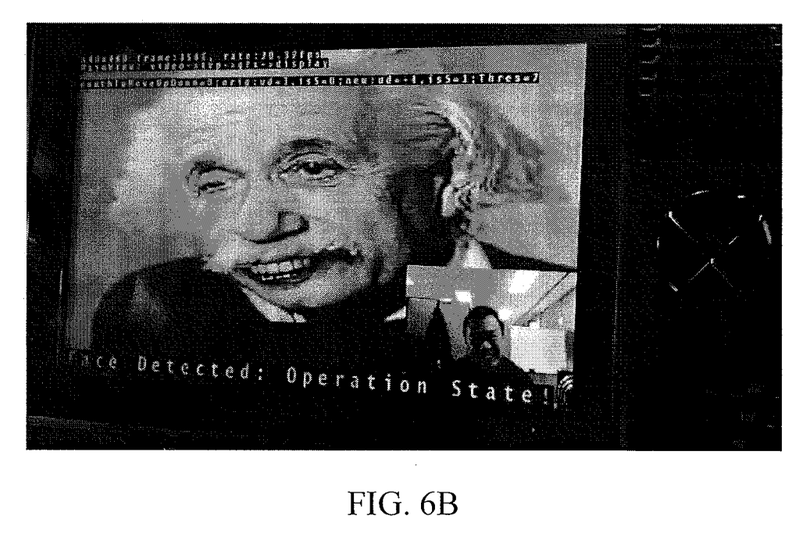
FIG. 6B illustrates an example of an image reconstructed using contour information and the key frame of FIG. 6B.

FIG. 6A illustrates an example of a keyframe and FIG. 6B illustrates an example of an image reconstructed using contour information and the key frame. As shown, the keyframe is manipulated so the facial features of the keyframe match the contour information.

In one aspect, a first frame is captured by the image capture device 470 and transmitted over the Internet 455 and received by the application 410 to be used as a keyframe. In another aspect, the keyframe is a local static picture stored and retrieved by the application 410. The local static picture may be a picture of a different person, be of the same person in a different environment, be of the same person wearing different clothes or articles (e.g., formal wear as opposed to casual wear, adding or removing glasses, etc.), be an enhanced version of the same person (e.g., removing blemishes, adding makeup, etc.), etc. than the person for whom contour information is captured. In some aspects, during reconstruction, the application 410 may be configured make additional changes to the reconstructed image (e.g., changing clothing of a person, adding makeup, removing/adding articles, hiding identifying information etc.). Further, in some aspects, during reconstruction, the application 410 may take into account additional information for reconstructing an image. For example, the image may be reconstructed based on contour information, a keyframe, and additional image information (e.g., a compressed frame of image data such as that from which the contour information was extracted).

For example, in some aspects, a first device running the application 410, along with transmitting face contour information over a network, may also send low bit rate compressed video of the additional frames. A second device running the application 410 may receive and use the low bit rate compressed video in conjunction with the face contour information and the keyframe to generate frames corresponding to each additional frame. In some aspects, the first device may try and send additional frames instead of face contour information for reproduction at the second device, however, if the transmission rate drops below a threshold (e.g., 30 frames per second), the first device may instead send face contour information. Accordingly, the second device running the application 410 may display additional frames sent in their entirety, or manipulate a keyframe based on contour information, depending on the data received. Further, the keyframe may be updated. For example, the first device may send an updated keyframe to the second device, or a new locally stored keyframe may be used. In some aspects, a user of the first device selects the keyframe. In some aspects, a user of the second device selects the keyframe.

The video driver 415 may be configured to communicate with a video card 460, which further communicates with a display 465. For example, as discussed above, the application 410 may receive or generate video data for display on the display 465. The application 410 may interact with the operating system 405, such as through APIs, to display the video data on the display 465. The operating system 405 may send the video data to the video driver 415, which controls the video card 460 to transmit video data to the display 465. The display 465 then displays the video data. For example, the image captured by the image capture device 470 and/or the reconstructed image from the application 410 may be displayed on the display 465.

It should be noted the functionality of application 410 may be done in real-time or close to real-time.

Figure 7:
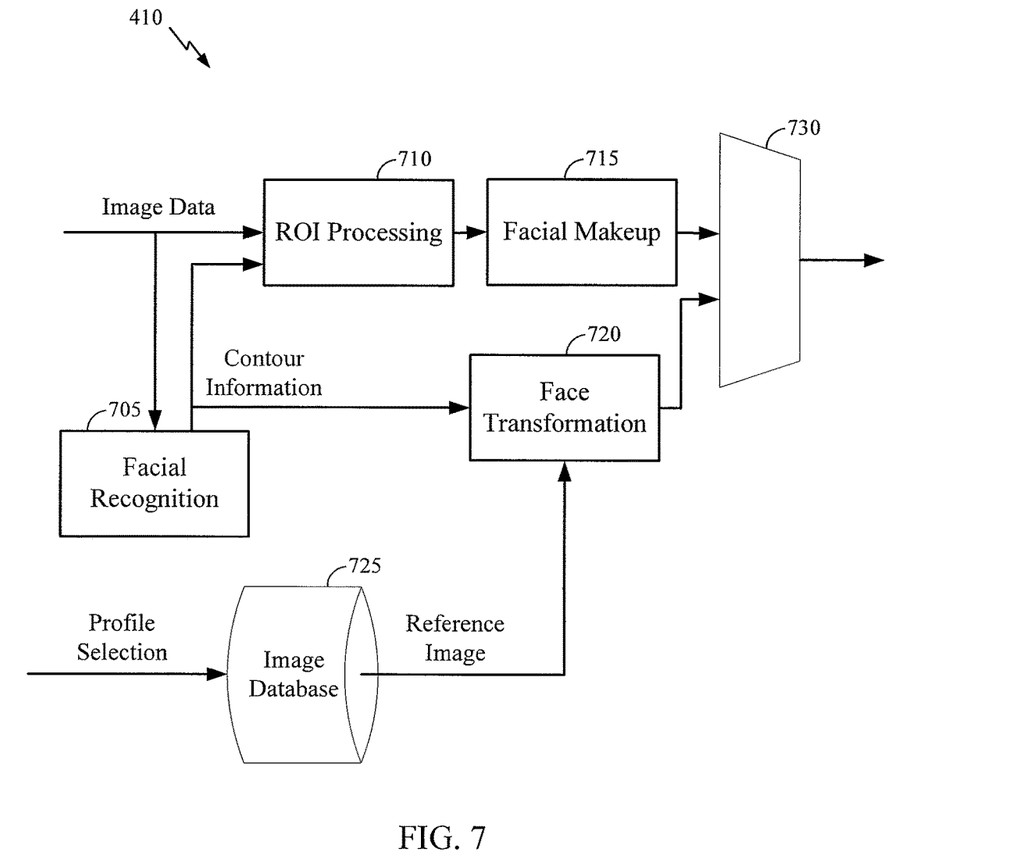
FIG. 7 illustrates a block diagram of an example of the application of FIG. 4.

FIG. 7 illustrates a block diagram of an example of the application 410. In the aspect shown in FIG. 7, image data is input into a facial recognition module 705. The facial recognition module 705 may be configured to locate faces in the image data and extract contour information for the faces as discussed above. The contour information is then sent to a face transformation module 720 configured to manipulate a keyframe based on the contour information as discussed above. The face transformation module may be configured to receive the keyframe from the image database 725. The selection of the keyframe from the database may be performed automatically or by a user. The manipulated keyframe is output to a selector module 730.

Further, image data and/or contour information is input into a region of interest (ROI) processing module 710. The ROI processing module 710 may be configured to remove features from or add features to certain regions of interest from the image data (e.g., remove or add articles such as glasses, change clothing, etc.). The regions of interest may be identified in part based on the contour information. The processed image may be sent from the ROI processing module 710 to a facial makeup module 715. The facial makeup module 715 may be configured to enhance an image of a person in the image (e.g., removing blemishes, adding makeup, etc.). The enhanced image may be sent from the facial makeup module 715 to the selector module 730. The selector module 730 may select between the manipulated keyframe and the enhanced image for output to a display or another device via a network. The selection may be made automatically or by a user. It should be noted that in some aspects, the facial recognition module 705 in a first device is used to extract contour information from the image data and send the contour information to a second device. The second device, running the application 410, then may not use the facial recognition module 705 to generate an image. Rather, the contour information received is input into the face transformation module 720. Further, the output of the face transformation module 720 may be input into the ROI processing module 710 as the "image data" input.

Figure 8:
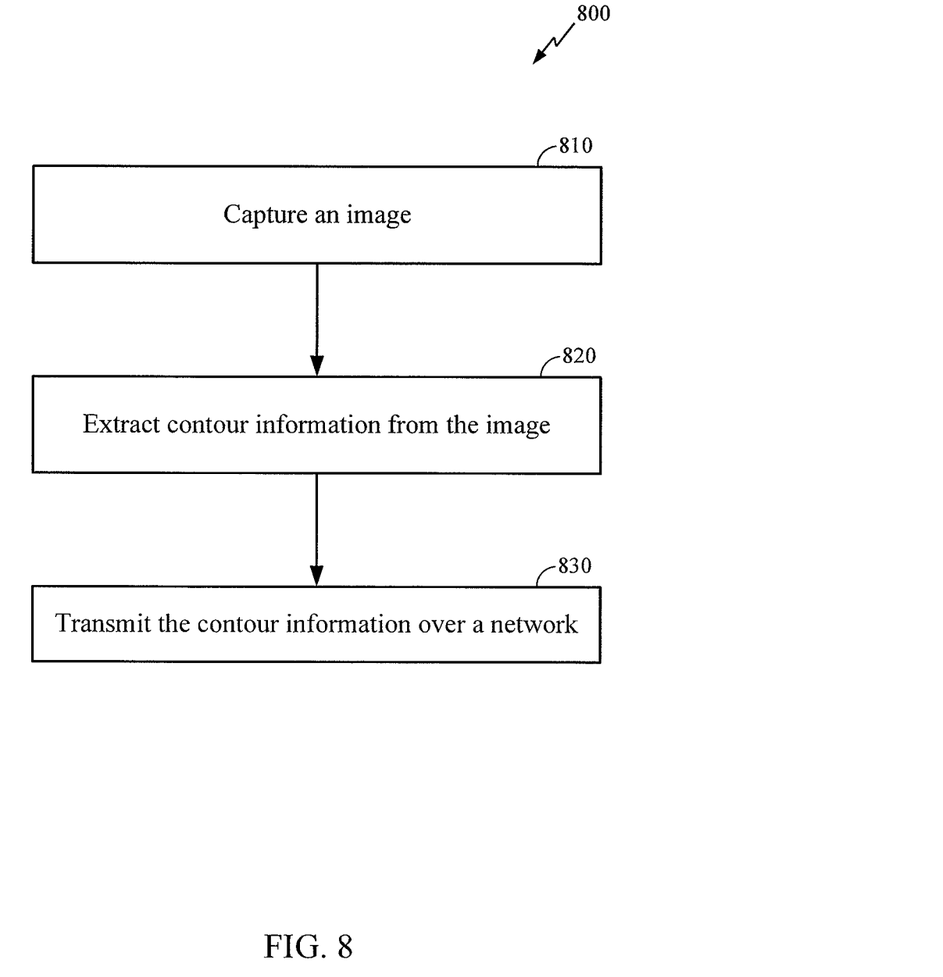
FIG. 8 is a flowchart of an example of a process for capturing an image and transmitting image data.

FIG. 8 is a flowchart of an example of a process for capturing an image and transmitting image data. The process 800 may be performed, for example, by the computing system 400 or any other suitable device. At a block 810, the image capture device 470 captures an image. At a block 820, the application 410 extracts contour information from the captured image. At a block 830, the application 410 transmits the contour information to another device over a network.

Figure 9:
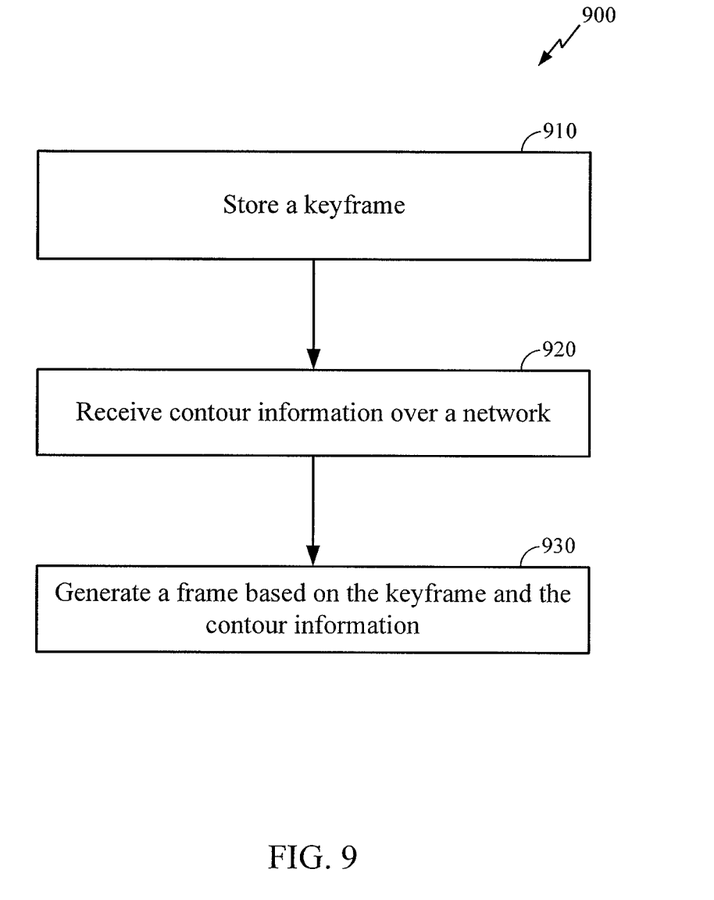
FIG. 9 is a flowchart of an example of a process for receiving image data and reconstructing an image.

FIG. 9 is a flowchart of an example of a process for receiving image data and reconstructing an image. The process 900 may be performed, for example, by the computing system 400. At a block 910, the application stores a keyframe. At a block 920, the application 410 receives contour information over a network from another device. At a block 930, the application 420 generates a frame based on the keyframe and the contour information.

One of ordinary skill in the art should understand that processes 800-900 are merely illustrative. Steps of processes 800-900 may be removed, additional steps may be added, and/or the order of steps changed, while still being consistent with the principles and novel features disclosed herein. In another aspect, each block of the flowcharts may be a "module" configured to perform the functions described with respect to the flowcharts.

The functionality described herein (e.g., with regard to one or more of the accompanying figures) may correspond in some aspects to similarly designated "means for" functionality in the appended claims. The functionality of the modules of FIGS. 2-4 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software or firmware executed by a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise non-transitory computer-readable storage media such as RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes flash memory storage, compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for reconstructing video data, the method comprising:
   storing, at a receiving device, a keyframe representing a face;
   receiving, at the receiving device and from a transmitting device, information for generating additional frames, wherein the receiving device receives the information from the transmitting device at a transmission data rate measured in frames per second,
      wherein if the frames per second of the transmission data rate is below a transmission rate threshold, the information comprises contour information related to one or more faces including data indicating an expression on the face represented by the keyframe, and
      wherein if the frames per second of the transmission data rate is equal to or above the transmission rate threshold, the information comprises low bit rate compressed video corresponding to one or more frames; and
   generating the one or more additional frames,
      wherein if the information comprises the contour information, generating the one or more additional frames includes adjusting the keyframe based on both the contour information and the expression on the face, and
      wherein if the information comprises the low bit rate compressed video, generating the one or more additional frames includes displaying, in their entirety, the one or more frames of the low bit rate compressed video.

2. The method of claim 1, wherein the contour information related to the one or more faces comprises positions of features of the one or more faces.

3. The method of claim 1, further comprising receiving the keyframe from the transmitting device.

4. The method of claim 1, wherein the one or more additional frames comprise one or more facial images.

5. The method of claim 4, wherein generating the one or more additional frames includes removing one or more features from the one or more facial images.

6. The method of claim 4, wherein generating the one or more additional frames includes adding makeup to the one or more facial images.

7. The method of claim 1, wherein generating the one or more additional frames further includes changing clothing associated with one or more persons included in the keyframe.

8. An apparatus comprising:
   a processor; and
   a memory in communication with the processor, the memory comprising instructions that when executed by the processor cause the processor to:
      store a keyframe representing a face;
      receive, at a receiving device and from a transmitting device, information for generating additional frames, wherein the receiving device receives the information from the transmitting device at a transmission data rate measured in frames per second,
         wherein if the frames per second of the transmission data rate is below a transmission rate threshold, the information comprises contour information related to one or more faces including data indicating an expression on the face represented by the keyframe, and
         wherein if the frames per second of the transmission data rate is equal to or above the transmission rate threshold, the information comprises low bit rate compressed video corresponding to one or more frames; and
      generate the one or more additional frames,
         wherein if the information comprises the contour information, generating the one or more additional frames includes adjusting the keyframe based on both the contour information and the expression on the face, and
         wherein if the information comprises the low bit rate compressed video, generating the one or more additional frames includes displaying, in their entirety, the one or more frames of the low bit rate compressed video.

9. The apparatus of claim 8, wherein the contour information related to the one or more faces comprises positions of features of the one or more faces.

10. The apparatus of claim 8, wherein the instructions when executed by the processor further cause the processor to receive the keyframe from the transmitting device.

11. The apparatus of claim 8, wherein the one or more additional frames comprise one or more facial images.

12. The apparatus of claim 11, wherein generating the one or more additional frames includes removing one or more features from the one or more facial images.

13. The apparatus of claim 11, wherein generating the one or more additional frames includes adding makeup to the one or more facial images.

14. The apparatus of claim 8, wherein generating the one or more additional frames further includes changing clothing associated with one or more persons included in the keyframe.

15. An apparatus comprising:
   means for storing a keyframe representing a face;
   means for receiving, at a receiving device and from a transmitting device, information for generating additional frames, wherein the means for receiving receives the information from the transmitting device at a transmission data rate measured in frames per second,
      wherein if the frames per second of the transmission data rate is below a transmission rate threshold, the information comprises contour information related to one or more faces including data indicating an expression on the face represented by the keyframe, and
      wherein if the frames per second of the transmission data rate is equal to or above the transmission rate threshold, the information comprises low bit rate compressed video corresponding to one or more frames; and
   means for generating the one or more additional frames,
      wherein if the information comprises the contour information, generating the one or more additional frames includes adjusting the keyframe based on both the contour information and the expression on the face, and wherein if the information comprises the low bit rate compressed video, generating the one or more additional frames includes displaying, in their entirety, the one or more frames of the low bit rate compressed video.

16. The apparatus of claim 15, wherein the contour information related to the one or more faces comprises positions of features of the one or more faces.

17. The apparatus of claim 15, further comprising means for receiving the keyframe from the transmitting device.

18. The apparatus of claim 15, wherein the one or more additional frames comprise one or more facial images.

19. The apparatus of claim 18, wherein the means for generating the one or more additional frames includes means for removing one or more features from the one or more facial images.

20. The apparatus of claim 18, wherein the means for generating the one or more additional frames includes means for adding makeup to the one or more facial images.

21. The apparatus of claim 15, wherein the means for generating the one or more additional frames further includes means for changing clothing associated with one or more persons included in the keyframe.

22. A computer program product for processing data for a program configured to receive video input from at least one capture device, the computer program product comprising:
 a non-transitory computer-readable medium having stored thereon:
  code for causing a computer to store a keyframe representing a face;
  code for causing the computer to receive, from a transmitting device, information for generating additional frames, the information being received at a transmission data rate measured in frames per second,
   wherein if the frames per second of the transmission data rate is below a transmission rate threshold, the information comprises contour information related to one or more faces including data indicating an expression on the face represented by the keyframe, and
   wherein if the frames per second of the transmission data rate is equal to or above the transmission rate threshold, the information comprises low bit rate compressed video corresponding to one or more frames; and
  code for causing the computer to selectively generate the one or more additional frames,
   wherein if the information comprises the contour information, generating the one or more additional frames includes adjusting the keyframe based on both the contour information and the expression on the face, and
   wherein if the information comprises the low bit rate compressed video, generating the one or more additional frames includes displaying, in their entirety, the one or more frames of the low bit rate compressed video.

23. The method of claim 1, wherein the data indicating the expression comprises coordinates of a mouth box, the mouth box enclosing a mouth portion of the face, and wherein the method further comprises:
 generating an additional frame by drawing teeth in a location of the mouth box; and
 drawing a face from the keyframe on top of the teeth.

24. The method of claim 23, the method further comprising drawing upper teeth in the mouth at a first size and drawing lower teeth in the mouth at a second size different than the first size based on the expression.

25. The method of claim 1, wherein the data indicating the expression indicates the expression is one of smiling, frowning, and speaking.

26. The method of claim 1, wherein receiving the low bit rate compressed video is based on whether the frames per second of the transmission data rate is below the transmission rate threshold.

* * * * *